Oct. 3, 1933.   G. P. BERRY   1,929,108
OIL PRESSURE REGULATOR
Filed July 18, 1929   2 Sheets-Sheet 2
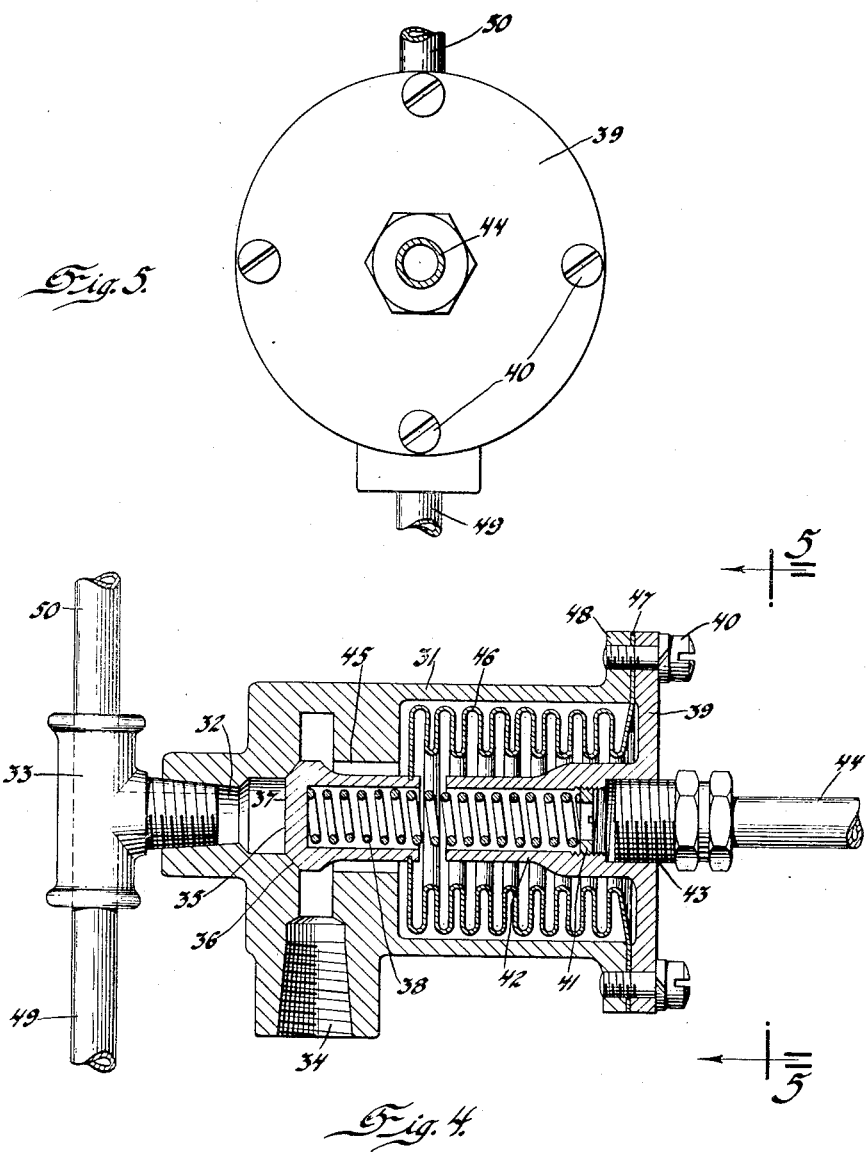
Inventor
George P. Berry Patented Oct. 3, 1933

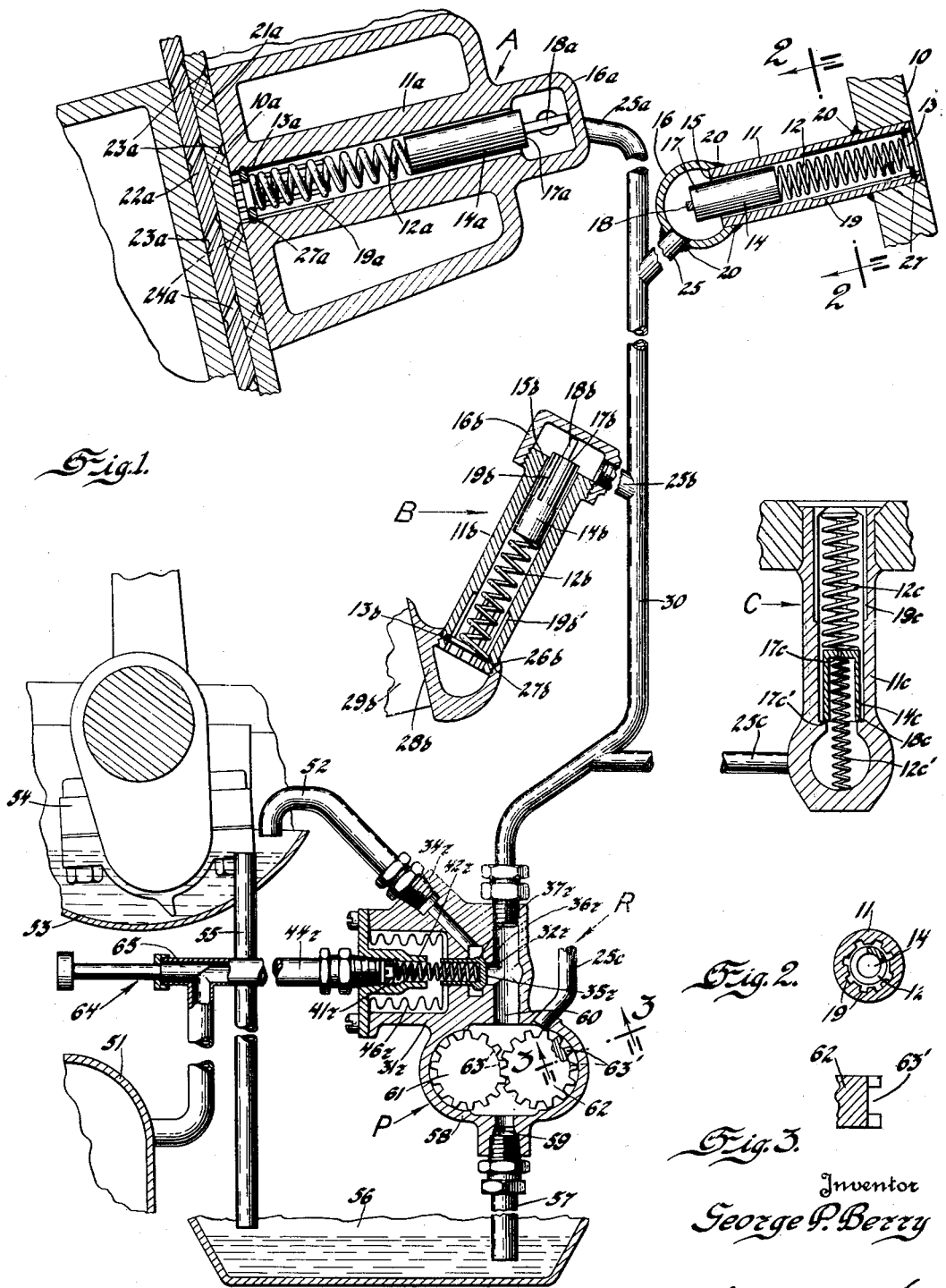

1,929,108

UNITED STATES PATENT OFFICE 1,929,108

OIL PRESSURE REGULATOR

George P. Berry, Detroit, Mich., assignor to General Motors Research Corporation, Detroit, Mich., a corporation of Delaware Application July 18, 1929. Serial No. 379,208

11 Claims. (Cl. 184—6)

It is a general object of this invention to provide improved means and methods suitable for use in the lubrication of internal combustion engines and the like; and the present embodiment of the invention illustrates the application of its various features to a so-called slide valve engine,—which may be generally similar to that described and claimed in copending patent application S. N. 325,881, filed Dec. 13, 1928.

In engines of the type referred to, the pressure under which the oil is delivered may advantageously vary inversely with the manifold vacuum; and the present embodiment aims: (1) to give a comparatively low pressure upon the lubricating oil at low speed and light load, higher pressure being applied to the oil as the speed and/or load increase; (2) to utilize, in determining the oil delivery, pressure-responsive means such as may be provided by a special unit having a communicating connection with a manifold,—this connection opening into a space at the "back" of a valve which controls the relief, or the extent of a by-pass opening, through which excess of pumped oil may be diverted and returned directly or indirectly to an oil pan, or the like, serving as a reservoir for said oil.

It is a further object of the present embodiments of the invention (3) to provide delivery-facilitating means, preferably utilizing novel features of pump construction, for imparting to and through the pumped oil comparatively rapid anti-clogging variations in pressure or rate of advance, these being favorable to prompt and reliable operation of the mentioned valve means and also to an efficient delivery of oil, by novel means included in the present invention, through outlet passages to the respective bearings which require lubrication.

As above implied, this invention, in its application to an engine, may involve a combinational use of various means and methods in mutually cooperative novel relationships; but said invention also includes (4) a pressure-regulator unit, above referred to, in which a by-pass outlet is controlled by a valve which is so connected with a bellows, or the like, that the extent of opening of said outlet or other passage is rendered responsive not only to the pressure of the pumped fluid but to one or more opposing pressures,—such as may be produced by the mentioned connection, from the interior of said bellows, with any suitable evacuating or pressure determining means, and/or by the use of a thermally responsive device and/or by means of an adjustable or other spring; and this unit is obviously capable of numerous alternative uses.

It is a further object of this invention (5) to provide an integral combination of such a unit as is last above referred to with a suitable pump,—said pump preferably including features of construction adapted to produce variations in pressure, or in the rate of advance of the pumped fluid, such as are favorable to the sensitiveness of the mentioned unit to variations in pressure; and the mentioned combination of said unit and pump naturally tends to economy of manufacture, to ease of installation and to the obviation of leakage.

It is well known that difficulty arises in advancing viscous liquids, at low temperatures, through restricted passage,—for the reason that outer layers of such liquids commonly remain sluggishly adherent to the walls of passages; and it is accordingly a further object of this invention (6) to provide, for use in the mentioned combinations or elsewhere, novel flow-assuring devices which involve the use of a pulsating variation in the pressure upon the pumped liquid,—said devices each preferably including a helical spring and being so simple as to be suitable for economical duplication at each delivery opening. The illustrated forms of this device are herein referred to as "oil-metering plugs" for the reason that each may include, with or without the mentioned helical spring, a small and loose-fitting plunger, disposed within a guide passage which serves for the delivery of oil, or the like; and this plunger, if used, may be reciprocated either by mechanical means or by means such as the mentioned variations in pressure under which the oil is conducted thereto. These flow-assuring or pulsating devices may be modified according to the intended position of use, and/or they may be extensively duplicated in each installation; the conjoint use of a suitable spring and a suitable plunger in each device produces results which are notably superior to those obtainable by the separate use of either of these features; and (7) the mentioned special pump, although originally designed for use in producing fluctuations in pressure such as have been found to assure efficient action of the mentioned "regulator" and the mentioned "plugs", may also be independently used.

The other objects of the present invention may be best appreciated from the following descriptions disclosing an illustrative organization comprising typical devices of the general character above referred to, taken in connection with the appended claims and the accompanying drawings.

Fig. 1 is a highly diagrammatic view, without scale, in which most parts pertinent to the present invention are shown as if in section, some parts being shown as if in elevation and other parts as broken away.

Figs. 2 and 3 are respectively detail sectional views which may be regarded as taken in planes such as are indicated by the lines 2—2 and 3—3 of Fig. 1.

Fig. 4 may be regarded as a vertical or other longitudinal sectional view separately showing a "regulator" resembling that which is shown in Fig. 1; and Fig. 5 is a section on line 5—5 of Fig. 4.

Referring first to the upper right-hand portion of Fig. 1, to lubricate a surface 10, an oil-metering plug comprising a tubular body 11 is shown as provided not only with an interior compression spring 12, retained in a delivery passage by a clip 13, but with a loosely fitting plunger 14, movable from a position near the inlet to said passage,—said plunger being normally pressed or otherwise biased toward said position near the inlet end 15 of said tubular body; and oil, or the like, may be delivered to said inlet end through a hollow head or manifold element 16, or an equivalent chambered connection. The plunger or plug 14 may be provided with a pressure-receiving annular, circular or other face 17; and either the body 11 or the plunger 14 may be provided with means, such as a finger loop or other stop element 18, to limit the outward movement of said plunger under the action of the spring 12 or its equivalent.

To assure delivery of a sufficient quantity of oil even when making a "cold" start, automatic relief means such as one or more channels 19 may be provided within the tube 12, a relatively free delivery being effected therethrough whenever the plunger 14 is forced well toward its limit of compression; but it should be noted that both the spring 12 and plug or plunger 14 are intended to "float" rather freely at all times. Thus, assuming the plunger 14 to be valveless, all delivery of oil past the same may depend upon the clearance provided at the periphery thereof; and this clearance is intended to be such that, under normal conditions of operation, the delivery is pulsating,—some oil being advanced at all times past said plunger. Assembly may be effected in any desired manner, as by welding at 20.

At A in Fig. 1, a tube 11a is shown as cast integral with an engine block and as extending through a cooling water space in such manner as to effect delivery of oil to a surface 10a and to a pair of slide-valve plates 21a and 22a,—these being shown as provided not only with superficial lubricant-distributing channels 23a but with intercommunicating but non-coincident passages 24a. In this embodiment a head or manifold element 16a which may supply a plurality of "plug" tubes is to be understood as communicating with a single supply pipe or conduit 25a (corresponding with a pipe 25, to head 16); and a similar relationship may subsist between pipes 25b and 25c shown in connection with units B and C,—additional characters, corresponding to those above employed, being applied to these units, with an addition of an "a" or a "b" or a "c".

Referring to the unit B in Fig. 1, the tubular element 11b is shown as terminally threaded at 26b and as provided with a wrench-receiving head 16b. In this form, the spring 12b is shown as terminally modified to provide an integral retaining clip 13b, entering a peripheral channel 27b (corresponding to the channel 27 and the channel 27a, of the respective forms shown in the upper portion of Fig. 1; and the plunger 14b, rather than the tube receiving the same, is shown as provided with longitudinal channels 19b—although a part of the bore of said tube may be slightly enlarged to cooperate therewith, as at 19b'. Lubricant delivered through the tube 11b, as the plunger 14b is caused to reciprocate therein (whether by variations in pressure upon a terminal surface 17b thereof or by other means) may advance through a duct 28b, to lubricate a slider 29b or other moving part; and it should be understood that any desired number of branches, such as 25, 25a and 25b, and 25c may be connected with a common source of lubricant under pressure, such as a pipe 30,—this pipe being directly or indirectly connected with a suitable source of oil and said oil being preferably subjected, in order to reciprocate said plungers and/or said springs, to rapid variations in pressure. This may be done by means such as a special pump P, hereinafter described, delivering into pipe or conduit 30.

The previously illustrated provisions for self-clearance by protrusion when retracted may, generally speaking, be more advantageous than any provision for such a valve action as is suggested by the showing of a seat at 18c; and it will be obvious that the tubular body and the head of a delivery unit such as that last described might be made so substantial as to permit it to be pressed or driven into a suitable opening provided therefor; and obvious also that the type of unit employed may often depend (a) upon whether it is on old equipment or on new equipment that the unit is to be used, (b) upon the position of use; and (c) upon the ease with which the requisite tubes or passages might be cast or otherwise formed in place upon new work; but, by way of further illustration, there is shown at C a form of delivery unit in which one end of a tubular element 11c is expanded after insertion, as by a pressing, a welding, a swaging or a spinning of the same in place; channels 19c, if used, being formed before or protected during the operation. From this or any unit, when positioned favorably to the action of gravity on a plunger such as 14c, all springs may be omitted; or either or both of the springs shown at 12c and 12c' may be employed,—the latter serving as a tension spring when extended by pressure applied through (say) delivery pipe 25c (shown as by-passing a regulator R) to areas 17c, 17c', or the like. In this connection, it is further emphasized not only that the character of each plunger and the spring employed therewith may vary with the position of use, the character of the oil and the expected ranges of temperature and pressure but that the springs must not be understood to be the only available means for plunger reciprocation nor to function exclusively as such means. The film-breaking or agitating and incidental warming effects of the springs (even when not provided with electrical connections—adapting them momentarily to serve as resistance heaters at starting) may be so important as to justify the view that the plungers serve primarily as manipulating means therefor.

Referring now to the pressure regulator shown in Fig. 4, this will be seen to comprise a main body 31 provided with a main passage in the form of an inlet opening at 32, communicating with an oil supply line represented by a T 33 and with a so-called by-pass outlet opening 34,—the advance of any excess oil from said inlet to said by-pass outlet being dependent upon the extent of opening of a hollow or other valve 35 relatively to a fixed seat 36. In order to render movements of the valve 35 dependent not only upon the pressure applied to an "outer" surface 37 thereof, exposed to the pumped lubricant or other liquid, but to an interior or "back" pressure opposing that upon surface 37, said valve is shown as containing a compression spring 38; instead of seating directly against a fixed element such as a closure plate 39, shown as secured to the body 31 by screws 40, the power of said spring may be rendered variable by adjustment of a threaded or other stop element 41; and/or, whether or not the plate 39 is provided with a comparatively long inwardly extending guide 42 for said spring, an integral inwardly extending boss may provide not only a stop for valve 35 and internal threads for engagement by the stop 41 for spring 38 but additional threads, as at 43, for use in connecting therewith a pipe 44, through which a fluid may be introduced or withdrawn for the purpose of varying the internal pressure upon the valve 35, or its equivalent, in accordance with variations in a remote body or condition.

In case the pipe 44, or its equivalent, is to be so employed as to provide for an automatic or other remote control of the pressure prerequisite to a given opening of the valve 35 to obviate leakage and to assure reliable operation, said valve element may be "ball ground" and/or may have somewhat the illustrated form of a cup or thimble, preferably with an ample clearance opposite a tubular portion 45,—with which a bellows 46 may be connected by a fluid-tight joint so formed that guide 42 may serve as a stop, limiting the inward movement of valve 35. A peripheral flange upon said bellows is shown as gripped, with the interposition of a gasket 47, between a flange 48 upon the body 31 and a peripheral portion of the plate 39.

When used in a lubricant system, a conduit 49 may connect one side of the T with a suitable pump or other source of supply and a conduit 50 may connect the other side of the T with a delivery conduit 30 or the like, the overflow outlet 34 may lead into any suitable receptacle for oil, or back into a crankcase or oil pan; and control pipe 44 or its equivalent may be connected with the intake manifold of the engine. It can readily be seen that if the spaces inside the bellows were left open to atmospheric pressure the device would function simply as a relief valve, the pressure under which oil is delivered being determined by the load which the spring and/or the atmosphere applies. However, when the space inside the bellows is evacuated, the oil pressure necessary to open the relief valve is less,—the amount of change in the oil pressure being determined by, for example, the depression in the manifold and bellows. Thus, when the space inside the bellows is connected to the intake manifold of the engine, at part throttle (when the vacuum in the manifold is high) the oil pressure necessary to open the relief valve is lower than it is when the engine throttle is opened wide and the vacuum in the manifold is low. It will be obvious that the use of this device is by no means limited to lubricating systems, the principles employed therein being applicable to any fluid system wherein it may be desirable to control a pressure upon one delivered fluid by variations in a pressure applied to the "back" of a relief valve,—as by means of a vacuum connection; but Fig. 1 nevertheless includes at R a showing of a special form of pressure regulator with which is incorporated a novel pump that is adapted to cooperate with all mentioned features.

In the lower central portion of Fig. 1, pulsations in pressure being requisite to the above mode of operation of the described "springs" and/or "plungers" and advantageous also for an anti-clogging effect in the operation of a regulator R, a regulator body 31r is shown as cast integral with the body of pump P; and (reference characters being applied to the regulator of Fig. 1 in the same general manner as they have been applied to Fig. 4 but with an "r" added) the bellows-connected pipe 44r is shown as leading to a manifold 51. Diagrammatically, the overflow outlet 34r is shown as leading, by a pipe 52, toward an open trough or receptacle 53,—into which connecting rods 54 may dip, for a splash effect; and an overflow pipe 55 is shown as thence conducting excess oil back to a pan 56,—into which intake pipe 57 of the pump P may extend. In addition to a body 58, provided with an inlet opening 59 and outlet opening 60 (which, in this embodiment, corresponds to the T inlet 49 shown in Fig. 4 as provided for the admission of oil pressure to the "outer" surface of the regulator valve) this pump P comprises the usual pair of tightly interfitting and intermeshing gears 61, 62; but, in order to provide desired pulsations, as a preferred means for the operation of the described delivery "plugs" and as favorable to the sensitiveness and reliability of action of the described regulator valve, one or both of the gears 61, 62, or corresponding parts of any alternative pump, may be provided with means assuring rapid but moderate variations in pressure, or pulsations in the movement of the oil or other fluid advanced by said pump. For the purpose last referred to, for example, one or two or more teeth of one or both of the gears 61, 62 may be slotted, as at 63 and/or 63′, in the general manner separately illustrated in Fig. 3.

In actual tests it has been ascertained that the use of a pump of this type is highly advantageous as a means of producing comparatively rapid reciprocation of the springs 12, etc., and/or the plunger 14, etc.; and that separate effects are attributable to the action of said springs,—preventing the lodgement or "freezing" of oil films within the comparatively inaccessible tubes 11, etc. The precise rate of reciprocation of the mentioned moving parts appears relatively unimportant, from 100 to 200 reciprocations per minute being satisfactory; and it will be understood that, after an initial rise in pressure in case the engine is cold, such rise in pressure being terminated as the mentioned reciprocation and other obvious factors warm the oil, the return of the plungers 14, etc. (from "forward" positions overlapping the channels 19, etc. to positions such as those in which said plugs are shown) automatically restricts the flow past said plugs to that permitted by the mentioned clearances. Adjustment of the pressure normally maintained may be effected by varying the position of the stop 41r; if desired, a valve 64 comprising the special plug 65, may be so advanced or otherwise manipulated in the conduit 44r as to render the pressure within the bellows 46r momentarily high and independent of that within the manifold 51,—to provide for exceptionally high pressure when starting cold;

and it will be understood that, regardless of whether or not the valve 35r may normally remain open, the "trembling" effect produced by a pump of the special type described is favorable to the sensitive operation of a regulator of the described character as well as to the operation of the described plungers and/or springs.

Although of subordinate interest, there is shown in Fig. 1, an oil-metering plug in which are used compression spring 12c and a tension spring 12c' (additional characters including a "c" being applied to this figure constantly with the usage of the preceding figures); but it should be understood not only that numerous additional alternative forms of the respective devices herein described might easily be devised but also the various features thereof might be independently employed,—without the slightest departure from the spirit and scope of the present invention; and that both said springs may be omitted when the circumstances and positions of use assure gravity action; and also that operation by mechanical means may seldom or never be more advantageous than use of hydraulic means of the general character described, to manipulate either flow-accelerating helices or clearance-providing plungers.

I claim:

1. In an oil distributing system: means for producing rapid variations in pressure within an oil conduit leading to a delivery passage; and delivery-facilitating means reciprocable in said passage.

2. In an oil distributing system: means for producing rapid variations in pressure within an oil conduit leading to a delivery passage; and delivery-facilitating means reciprocable in said passage by said variations in pressure.

3. In an oil distributing system: means for producing rapid variations in pressure within an oil conduit leading to a delivery passage; and delivery-facilitating means reciprocable in said passage,—said means including a plunger and means for its retraction.

4. In a lubricant distributing system for an engine having a manifold; means for conducting oil to delivery passages; means for advancing the oil thereto under pressure; and means, including a valve, to render such advance responsive to variations in pressure within said manifold,—one of said means being provided with means for subjecting said valve, when unseated, to anti-clogging vibrations.

5. In a lubricant distributing system for an engine having a manifold; means for conducting oil to delivery passages; means for advancing the oil thereto under pressure; and means, including a valve, to render such advance responsive to variations in pressure within said manifold,—one of said means being provided with means for subjecting said valve, when unseated, to anti-clogging vibrations, and said passages being provided with delivery means responsive to said vibrations.

6. In a lubricant distributing system, means adapted to conduct the lubricant under pressure to a delivery passage, a plunger of uniform diameter movably mounted in said passage, said plunger being of such cross-sectional area relative to the area of said passage as to normally provide a small amount of clearance therebetween through which the lubricant may flow, and means associated with said passage adapted to increase the amount of clearance between the plunger and the wall of said passage when the pressure on said plunger is increased.

7. In a lubricant distributing system, means adapted to conduct the lubricant under pressure to a delivery passage, a plunger of uniform diameter movably mounted in said passage, said plunger being of such cross-sectional area relative to the area of said passage as to normally provide a small amount of clearance therebetween through which the lubricant may flow, the wall of said passage having grooves formed therein whereby when the plunger is caused to move in the passage by an increase in the lubricant pressure, an increasing amount of clearance will be provided between the plunger and the wall of the passage.

8. In a lubricant distributing system, means for producing intermittent relatively large variations in pressure within a conduit leading to a delivery passage, and means located in said passage serving as a metering device to limit the quantity of lubricant which may flow through said passage, said metering means being adapted to move longitudinally in said passage as the lubricant pressure increases and decreases, for the purpose of removing congealed lubricant from said passage.

9. In a lubricant distributing system, means for producing intermittent relatively large variations in pressure within a conduit leading to a delivery passage, and a plunger located in said passage, the clearance space between the plunger and the wall of the passage serving as a metering orifice through which the lubricant flows, said plunger being adapted to move longitudinally in said passage as the lubricant pressure increases and decreases for the purpose of removing congealed lubricant from the clearance space between the plunger and the wall of the passage.

10. In a lubricant distributing system, means for producing intermittent relatively large variations in pressure within a conduit leading to a delivery passage, a plunger located in said passage, the clearance space between the plunger and the wall of the passage serving as a metering orifice through which the lubricant flows, said plunger being adapted to be moved in one direction in said passage by an increase in the lubricant pressure, and resilient means located in said passage adapted to move the plunger in the opposite direction when the lubricant pressure is decreased, whereby the resultant reciprocating movement of the plunger in the passage removes congealed lubricant from the clearance space between the plunger and the wall of the passage.

11. In a lubricant distributing system for an engine, means for conducting oil to delivery passages, and means for advancing the oil thereto under pressure comprising a gear pump having intermeshing teeth, some of the teeth being so formed as to cause variations in the discharge pressure of said pump.

GEORGE P. BERRY.